US00RE37066E

(19) United States
(12) Reissued Patent
Casey et al.

(10) Patent Number: US RE37,066 E
(45) Date of Reissued Patent: Feb. 27, 2001

(54) SOIL SAMPLING SYSTEM WITH SAMPLE CONTAINER RIGIDLY COUPLED TO DRIVE CASING

(75) Inventors: Michael B. Casey, Woodacre; Murray D. Einarson, Palo Alto, both of CA (US)

(73) Assignee: Precision Sampling Incorporated, Richmond, VA (US)

(21) Appl. No.: 09/018,651

(22) Filed: Feb. 4, 1998

Related U.S. Patent Documents

Reissue of:
(64) Patent No.: 5,488,876
Issued: Feb. 6, 1996
Appl. No.: 08/464,592
Filed: Mar. 22, 1995

U.S. Applications:

(63) Continuation of application No. 07/954,987, filed on Sep. 30, 1992, now abandoned.

(51) Int. Cl.[7] ..... G01N 1/04
(52) U.S. Cl. ..... 73/864.44; 73/864.45
(58) Field of Search ..... 71/864.44, 864.45; 175/20, 58, 249

(56) References Cited

U.S. PATENT DOCUMENTS

| | | | | |
|---|---|---|---|---|
| 4,316,393 | * | 2/1982 | Philipenko | 73/864.45 |
| 4,456,079 | | 6/1984 | Rassieur . | |
| 4,518,050 | * | 5/1985 | Sollie et al. | 73/864.45 |
| 4,735,269 | * | 4/1988 | Park et al. | 175/58 |
| 4,770,030 | * | 9/1988 | Smith | 73/864.45 |
| 4,953,637 | | 9/1990 | Starr et al. . | |
| 5,211,248 | * | 5/1993 | Nosewicz et al. | 175/20 |

FOREIGN PATENT DOCUMENTS

9301477 * 1/1994 (WO) ..... E21B/25/00

OTHER PUBLICATIONS

Diedrich Drill—7 pages of advertising materials (undated).*
Linda Aller, et al., Handbood of Suggested Practices for the Design and Installation of Ground—Water Monitoring Wells, (Dublin, Ohio: National Water Well Association), pp. 80–123.*
Advertising Brochure—Simco 2800.*
Advertising Brochure—Metaprobe.*
Advertising Brochure—Drill Systems Drilling Accessories.*
Advertising Brochure—Solinst Soil Core Sampler.*
Advertising Brochure—Drill Systems CSR 1000AV.*
Advertising Brochure—CME Drill Rigs/Well Exploration.*

(List continued on next page.)

*Primary Examiner*—William Oen
(74) *Attorney, Agent, or Firm*—Miles & Stockbridge P.C.; John C. Kerins

(57) ABSTRACT

A soil sampling system includes a rig for driving a drive casing, a sample barrel, and sample liners simultaneously into soil to be sampled. The rig includes mechanisms for driving the casing, barrel, and lining in three modes: hydraulic hammer, continuous pressure, and vibration. The three drive mechanisms can be operated singly or in any combination. After the casing, barrel, and liners are advanced a selected depth into the soil, the barrel and liners are removed. The drive casing remains in the soil. New sample liners are put into the sample barrel, and an inner rod is attached to the sample barrel. The sample barrel is then replaced into the drive casing, and extensions are attached to the drive casing. The drive casing, including extensions, and the sample barrels, along with sample liners and inner rod, are driven further down into the soil. The rig also includes a winch that can be coupled to the inner rod or sample barrel so that the casing and/or barrel (including sample liners) can be retrieved from the drive casing. A clamp system allows the sampler to be hydraulically retracted from the ground when sampling is finished.

26 Claims, 8 Drawing Sheets

OTHER PUBLICATIONS

Advertising Brochure—Mobile Drill Model B–24 Surveyor.*
Advertising Brochure—Canterra Equipment Bulldog.*
Advertising Brochure—Halco Drill Tools.*
Advertising Brochure—Mobile Drill Portable Minuteman.*
Advertising Brochure—Simco 2400 SK—1.*
Advertising Brochure—Geoprobe Soil Probing Equipment.*
Advertising Brochure—Metadrill.*
Advertising Brochure—Powercore.*
Adertising Brochure—Drill Systems MPD 1000—Trailer Mounted Drill Rig.*
Adertising Brochure—Drill Systems MPD 1000—Drill Rig Truck Mounted.*
Advertising Brochure—Drill Systems Explorer 1000.*
Advertising Brochure—Drill Systems AP 1000 Becker Hammer Drill.*
Advertising Brochure—Drill Systems MPD Helicopter Lift Drill.*
Advertising Brochure—CME Continuous Sample Tube System.*
Advertising Brochure—Christensen 94mm Wireline Core Barrel System.*

* cited by examiner

SOIL SAMPLING SYSTEM WITH SAMPLE CONTAINER RIGIDLY COUPLED TO DRIVE CASING

Matter enclosed in heavy brackets [ ] appears in the original patent but forms no part of this reissue specification; matter printed in italics indicates the additions made by reissue.

This is a continuation of application Ser. No. 07/954,987 filed Sept. 30, 1992, hereby abandoned.

BACKGROUND OF THE INVENTION

The present invention relates to soil sampling systems and, more particularly, to hollow-tubed soil samplers. A major objective of the present invention is to provide for enhanced collection of soil samples for chemical or physical analysis.

Contamination of soils is a major environmental concern. Toxic compounds can remain in the soil for years, and can seep into groundwater, causing serious environmental and health problems. Because contamination is often located many feet below the surface, identifying and treating contaminated soils can be problematic.

In a typical system for sampling for soil contamination, soil samples are collected at discrete levels. A hollow-stem auger powered by a large motor drill rig is typically used. The drilling rig can weigh as much as 30 tons, and is typically mounted on a large truck. The auger is typically about 8" in diameter. The outside has a spiral flighting that aids travel through the soil and that removes the waste dirt ("cuttings") from the borehole. During drilling, the hollow auger is plugged.

After the initial soil depth to be investigated is reached, and while the auger is in place in the ground, the plug is removed. Next, a hollow cylindrical drive sampler is inserted into the hole created by the auger. The drive sampler is driven, via a drive rod and hydraulic or pneumatic hammer, ahead of the lead auger into the soil to be sampled. Soil is forced into the hollow center of the drive sampler, which can contain stainless steel or brass sample sleeves. A large winch, usually attached to a mast about 20' tall, then engages the drive rod, and the drive rod, sampler, sleeves, and soil are removed, leaving an open hole. For the next sample, the auger drills to the next depth to be sampled, and the process is repeated.

In cases of chemical contamination, contaminated soil may be confined to thin soil layers, sometimes only an inch or two thick. The discrete sampling of many previous systems, often taken at intervals of several feet, can miss areas of contamination and yield false negative results.

Furthermore, where contamination is encountered, the cuttings created by the typical augering system and brought to the ground surface, are also often contaminated, and must be disposed of as hazardous waste. Such disposal is often difficult and very expensive, because the soil requires special handling and disposal.

Single-rod non-auger drilling systems are sometimes used to sample relatively shallow depths. Single-rod systems can often be driven by more compact drilling rigs, but they are associated with other problems. To retrieve the sampler from the soil, skin friction of the soil must be overcome, requiring a significant amount of pull. In addition, because the borehole is not continuously cased off, contaminants from upper levels often slough off and contaminate lower levels, leading to false positive readings.

The drilling rig and winch in the typical prior art system can often harm the environment around the area to be tested.

As described above, the entire system can be over 20' tall, weigh 30 tons, and be mounted on a truck 20' long. A rig in place can disrupt traffic. Landscaping around the area to be tested can be destroyed. If the area to be tested is under an existing structure, roofs or walls may have to be removed. Providing access for the equipment can also be destructive, time-consuming, and expensive.

What is needed is a soil sampling system that is compact and efficient, that allows for continuous, accurate soil samples to be collected, and that minimizes the amount of cuttings created during sampling.

SUMMARY OF THE INVENTION

In accordance with the present invention, a soil sampling system includes a double-rod sampler and a driving rig. The double-rod sampler includes a casing and inner sample barrel, along with sample liners, that are driven simultaneously into the soil to be sampled. The system allows a vertically continuous sample to be collected while casing off the hole, thus sealing the borehole from sloughed-off contaminants from higher levels to minimize false readings of contamination.

The drive casing and sample barrel (with sample liners) are driven simultaneously into the ground. The barrel and liners are then removed, while the drive casing stays in place. New sample liners are placed in the sample barrel, and a new length of drive casing and an inner rod are attached. The liners, barrel, drive casing, and inner rod are then driven a further distance into the ground, and the process is repeated.

Minimal cuttings are created by the double-rod sampling system. Since the sample rod system is narrow (for example, the system can be only 2.25" in diameter at the widest point that enters the ground as opposed to 8" typical of systems in the prior art), far fewer cuttings are created. Most of the soil displaced by the double-rod system is retrieved in the sample barrel; the rest is compressed into the surrounding soil. The double rod system also does not have flightings that can carry contaminated cuttings to the surface, as does the hollow-stem auger.

Removal of the sample from the soil is much easier than in the prior art. Because the borehole is sealed off by the drive casing, there is no soil-skin friction to overcome when retrieving the sample barrel. Removal of the sample barrel (containing the soil samples in the sample liners) is easier and quicker, improving the speed and efficiency of the system of the invention as compared to previous systems.

The rig driving the soil sampling system can be significantly more compact than is typical in the prior art. It can be mounted on a conventional skid loader, and thus can be conveniently moved into locations that would not accommodate a conventional drilling rig. The rig can be configured to slant drill and can even drill horizontally. The double-rod sampling system can thus sample under buildings or existing structures without the necessity of dismantling or destroying them. Thus, the invention provides for reliable and effective sampling of contaminated soils, even at sites where access is restricted.

In a method in accordance with the invention, a drive casing, sample barrel, and sample liners are driven simultaneously into the soil to essentially the same depth. Thus, all portions of the borehole are sealed off while the sample is obtained, preventing sample contamination from sloughed-off soil from higher levels. In addition, the sample barrel and liners can be removed and replaced while the drive casing stays in place.

The method of the invention of taking and retrieving samples facilitates the taking of continuous samples. The bottom sample depth attained by one round of sampling becomes the top sample depth of the next round of sampling. A continuous sample is thus obtained and even thin layers of contamination are retrieved, thus maximizing sampling reliability. These and other features and advantages of the present invention are apparent in the following description with reference to the drawings below.

DESCRIPTION OF THE PREFERRED EMBODIMENTS

Figure 1:
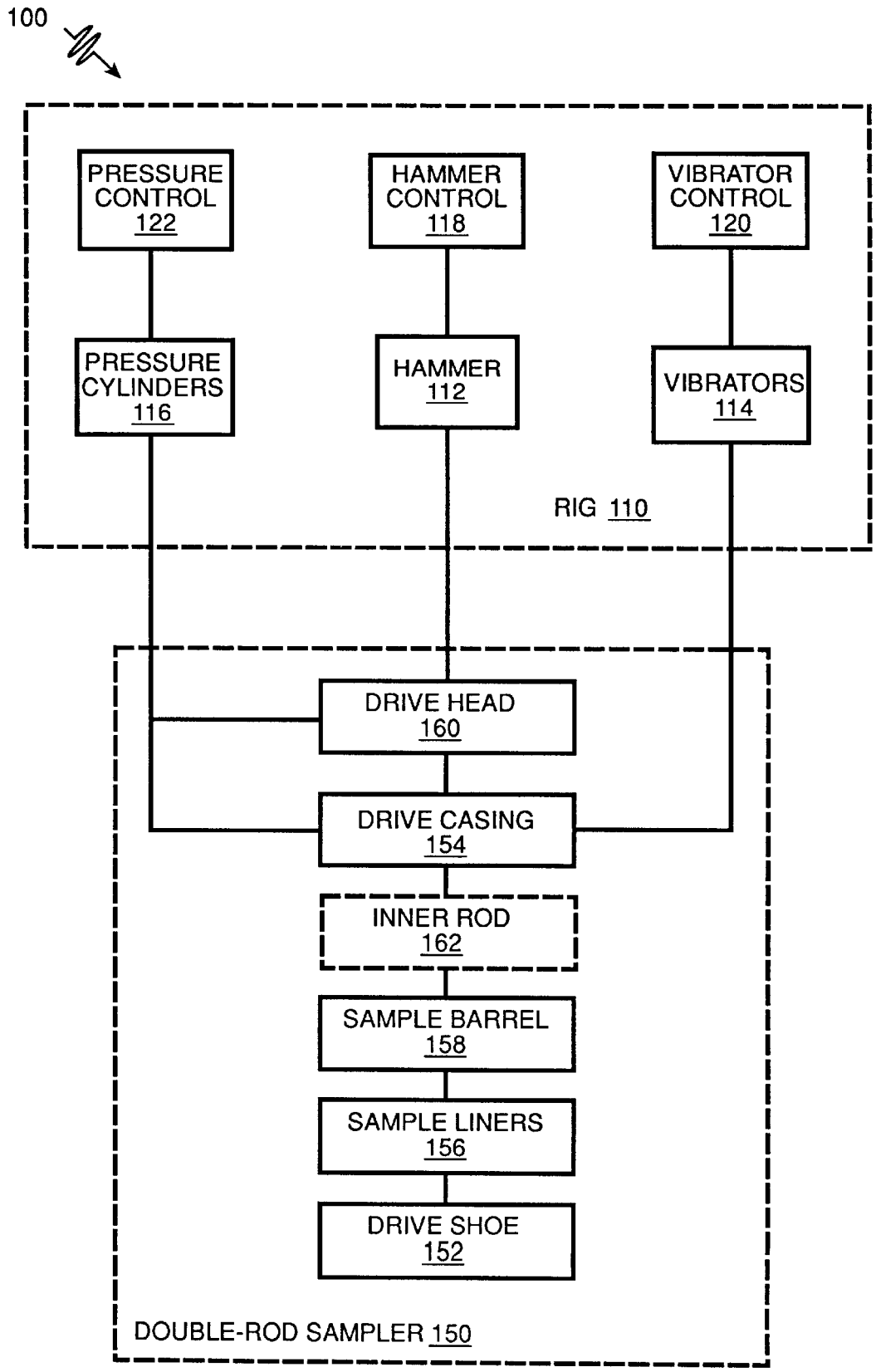
FIG. 1 is a block diagram of a double-rod sampling system in accordance with the present invention, emphasizing components used in driving the sampler.
Figure 2:
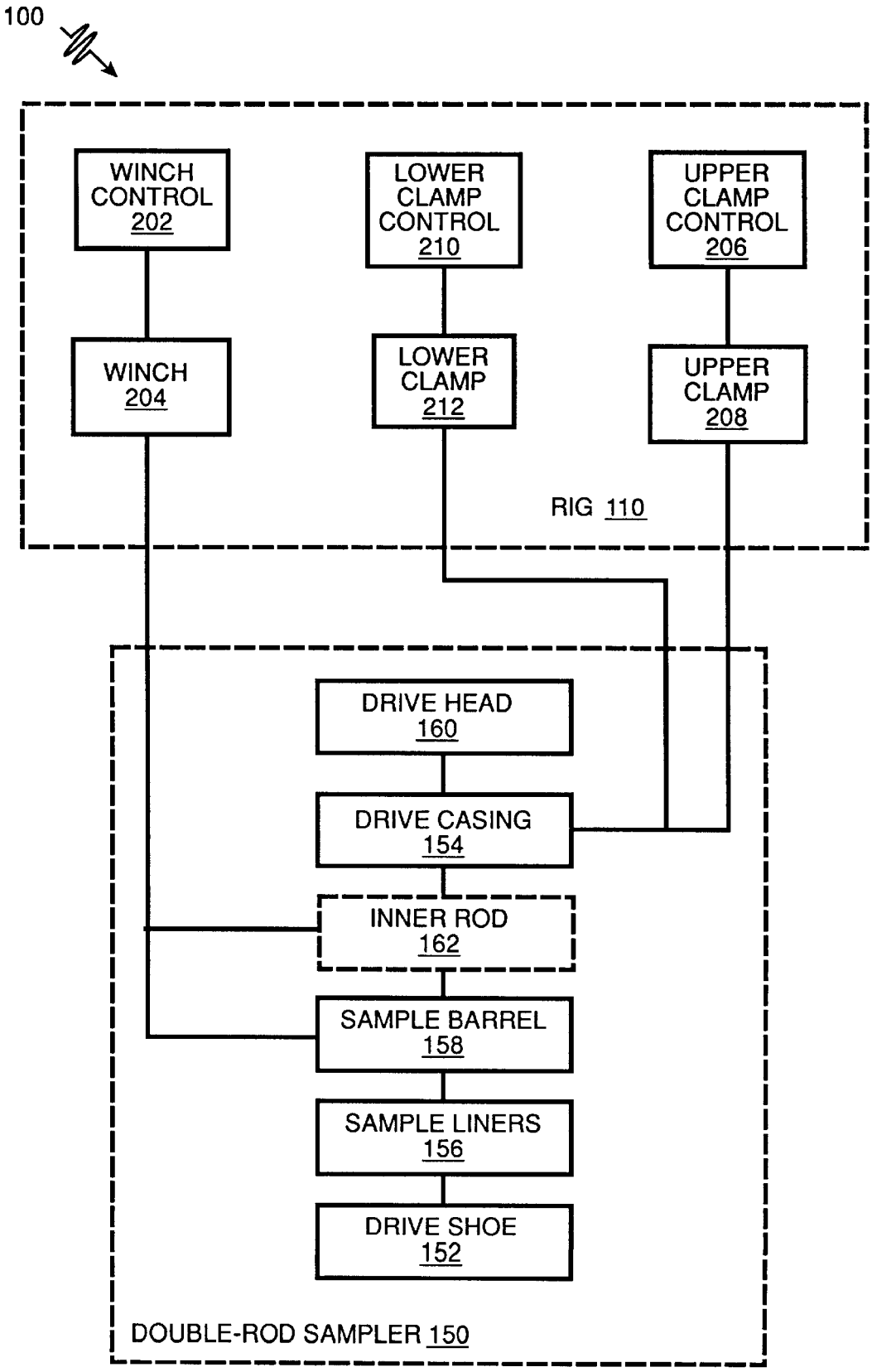
FIG. 2 is a block diagram of the double-rod sampling system of FIG. 1, but emphasizing components used in retracting the sampler.

In accordance with the present invention, a double-rod soil sampling system 100 comprises a sampling rig 110 and a double-rod sampler 150, a shown in FIGS. 1 and 2. Sampling rig 110 includes three driving systems: a hydraulic hammer 112, hydraulic vibrators 114, and hydraulic pressure cylinders 116, shown in block diagram in FIG. 1. Respective drive controls include hammer controls 118 (including a hammer slide control that horizontally positions hammer 112 and a hammer pounding control the controls the pounding of hammer 112); a vibrator control 120; and a pressure control 122.

Sampling rig 110 also includes two retraction systems and their controls, as shown in block diagram in FIG. 2. A sample retrieval system includes a winch control 202 and a winch 204. A sampler retrieval system includes an upper clamp control 206, controlling upper clamp 208, and a lower clamp control 210, controlling lower clamp 212. The controls are mounted on the rig and control the respective driving and retracting systems of FIGS. 1 and 2. Sampling rig 110 drives and retracts a double-rod sampler 150 and its components, shown in block diagram in FIGS. 1 and 2.

In double-rod sampler 150, a drive shoe 152 is attached to a *non-rotatable* drive casing 154. Next, sample liners 156 are placed inside a sample barrel 158, which in turn is placed within drive casing 154. A drive head 160 is then attached to the top of drive casing 154, rigidly coupling drive casing 154 and sample barrel 158. Double-rod sampler 150 is then driven into the soil by one or a combination of the drive systems of rig 110.

Drive head 160, drive casing 154, sample barrel 158, sample liners 156, and drive shoe 152 are thus driven into the soil as a unit. When the bottom depth for a round of sampling is reached, drive head 160, drive casing 154, sample barrel 158, sample liners 156, and drive shoe 152 are in the same relative positions they were in before being driven into the soil. Sample liners 156 are filled with soil sample. In the preferred embodiment, the bottom edges of drive casing 154, sample barrel 158, and sample liners are at the same level, with the bottom edge of drive shoe extending about 1.8" below that level. In other embodiments, the bottom edge of drive casing 154 can extend up to 12" below the bottom edge of sample liners 156.

Once sample liners 156 are filled with a sample, winch 204 is attached to sample barrel 158. Winch control 202 then causes winch 204 to pull sample barrel 158, containing sample liners 156, from the soil. Drive casing 154 can be left in the soil to case off the hole while the barrel and liners are removed.

New sample liners can then be placed into sample barrel 158, and sample barrel 158 and liners 156 can then be replaced within drive casing 154. An additional length of drive casing can then be attached to the drive casing in the soil. An inner rod 162 can be attached to the sample barrel to keep the sample barrel and liners pressed to the bottom of double-rod sampler 150. Inner rod 162 is a three-foot steel tube about 1.5" in diameter. The upper end of inner rod 162 is female threaded, and the bottom end is male threaded, so that lengths of inner rod can be coupled together. Use of the inner rod allows for the use of only one segment of sample barrel. Because inner rod 162 is attached for sampling only after the first round of sampling, it is shown in the block diagrams (FIGS. 1 and 2) in dashed lines. Drive head 160 is then replaced, and system 100 is ready for another round of sampling.

The pressure, hammer, and vibration systems, *each of which is suitably used as a direct push system,* can be operated singly or in any combination to drive sampler 150 into the ground. The selection of drive mechanisms is operator controlled, based on soil conditions and monitoring of the driving process.

Winch 204 is attached indirectly to sample barrel 154. Winch 204 is then operated alone to retrieve sample barrel 158 and sample liners 156 for each round of sampling. When the sampling procedure is completed, upper clamp 208 is clamped to drive casing 154, and pressure cylinders 116 are operated in reverse to remove drive casing 154 and drive shoe 152 from the ground. Upper clamp 208 and lower clamp 212 are operated independently. When sampler 150 is retracted over 3' from the ground, the upper clamp can be released, and the upper 3' section of drive casing can be removed. During this removal, lower clamp 212 is clamped to a lower section of drive casing to keep sampler 150 suspended in the borehole. Upper clamp 208 is then reclamped, lower clamp 212 is released, and the procedure is repeated.

Figure 3:
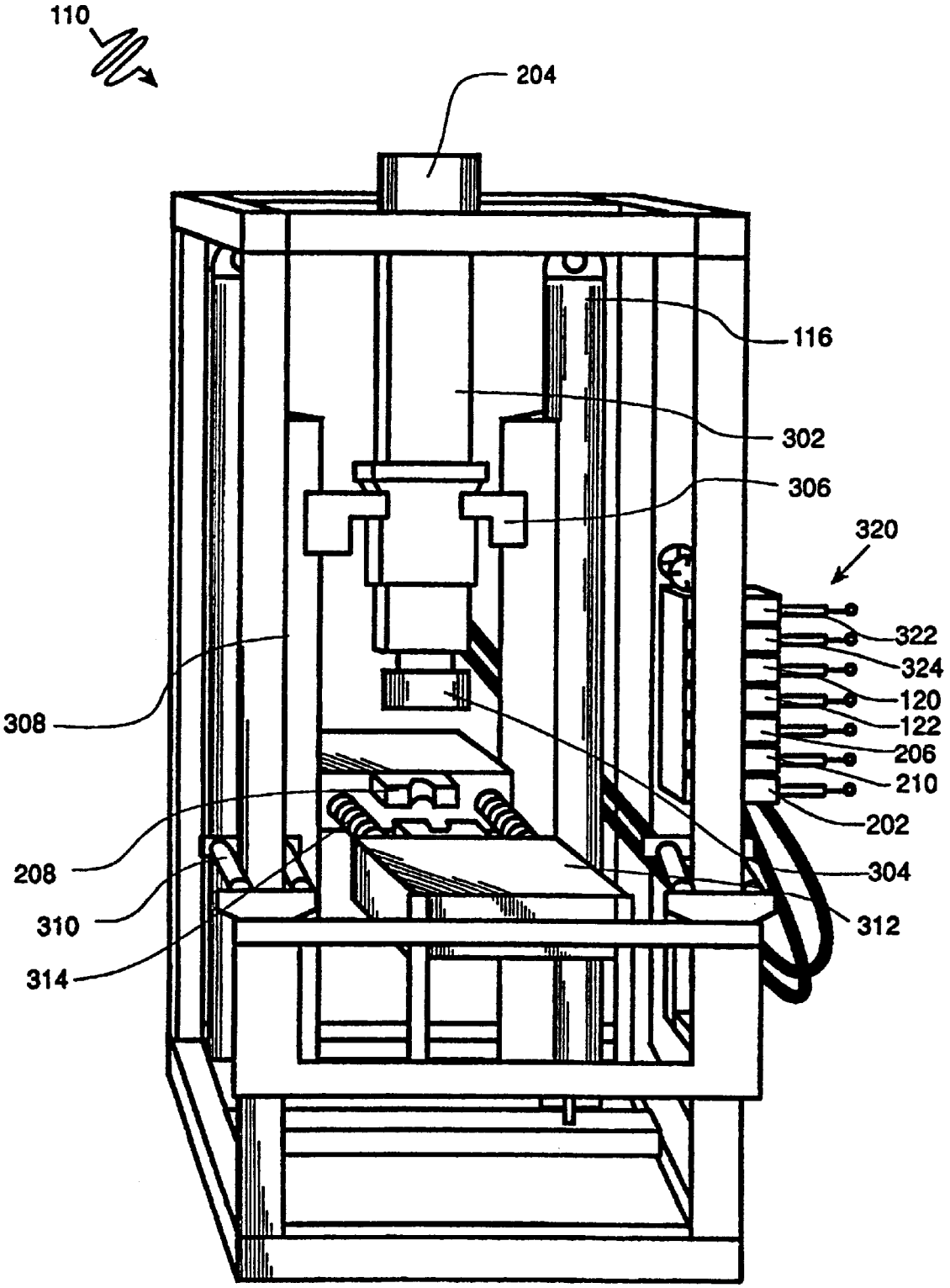
FIG. 3 is a schematic perspective view of a rig of the system of FIGS. 1 and 2.

Rig 110, shown in perspective view in FIG. 3, is a compact mounting system for hammer 112, vibrator 114, pressure device 116, and winch 204 of FIGS. 1 and 2. The rig weighs about two tons, and can be approximately 8'×3'×3'. Rig 110 drives and retracts the double-rod soil sampler shown schematically in FIG. 4. Soil sampler 150 is placed within the jaws of an upper clamp 208, beneath a hammer housing 302. Hydraulic hammer 112 is a jackhammer-type pile drive housed in rectangular hammer housing 302. One example of such a hammer is the OKADA model OKB301, as available for purchase in September 1992, from Okada Company, Osaka, Japan. The hydraulic hammer delivers energy of about 250 ft. lbs. per blow, with variable rates of about 800–1300 blows per minute. The hammer blows are delivered by a piston that is hydraulically moved up and down within hammer housing 302. A hammer foot 304 contacts drive head 160 to force double-rod sampler 150 into the soil. The hydraulic hammer is particularly useful in penetrating soil conditions such as unconsolidated sediments or gravel deposits. The number and force of blows required to advance the sampler depends on the compaction/density and composition of the soil being sampled. For example, for a given force, very dense sand can take more than five times as many blows to advance the sampler a given distance than would loose sand; hard clay can take more than ten times as many blows than would very soft clay.

A hammer slide 306 slides hammer 112 horizontally by means of interlocking slots to position it over sampler 150 for maximum striking effectiveness, and to move hammer 112 out of the way so that the winch line can be attached to retrieve sample barrel 158 and sample liners 156 after a round of sampling. Hammer slide 306 is bolted to a hammer support stanchion 308. Hammer support stanchion 308 is fitted with rollers 310 that allow it to move vertically to position hammer foot 304 to contact or release soil sampler 150.

Pressure cylinders 116 transmit pressure to double-rod sampler 150 through a rectangular upper-clamp-drive housing 312. Pressure cylinders 116 can provide up to 14,000 pounds per square inch of continuous pulldown pressure. Hydraulic pressure cylinders 116 can also be operated in reverse for retraction of double-rod sampler 150.

Upper clamp 208 clamps onto drive casing 154, activated by hydraulic cylinders (not shown) housed inside upper-clamp-drive housing 312. Upper clamp 208 steadies and guides double-rod sampler 150 and applies pull-down force from hydraulic cylinders 116 as sampler 150 is driven into the soil. Extension springs 314 compress when pressure is applied to clamp 208. Upper clamp 208 can also transmit vibrations from vibrators 114, located inside upper-clamp-drive housing 312, when the vibrators are activated. The vibrators are industrial vibrators typically operated at a range of 50–125 Hertz (Hz). The vibrations help reduce soil friction, and thus help ease the sampling rods into the soil. Upper clamp 208 is also clamped to the drive casing during retraction of the drive casing from the borehole.

Lower clamp 212 (not shown so as not to obscure other features) is located about three feet directly below upper clamp 208. The lower clamp contains a hydraulic cylinder only, not vibrators. Lower clamp 212 holds drive casing 154 during retrieval, preventing it from falling into the borehole.

To retrieve sample barrel 158, hammer slide 306 moves hammer 112 out of the way. Drive head 160 is removed from the exposed drive casing, and a retrieval head is screwed on. The retrieval head is threaded for attachment at the lower end, and has a bail at the upper end. Wire rope from winch 204 is attached to the bail. Winch control 202 is then operated to cause winch 204 to pull sample barrel 158 from drive casing 154.

When the sampling is completed and the final sample barrel and liners have been removed from the drive casing, the remaining components of the sampler are retrieved from the borehole. Upper clamp 208 is closed around drive casing 154. Pressure cylinders 116 are then operated in reverse to pull the remaining components of double-rod sample 150, including drive casing 154 and drive shoe 152, about 5' from the ground. (Alternatively, the sample barrel and liners can be retrieved along with entire double-rod sampler 150 instead of being removed first.) Upper clamp 208 is then disengaged, and the upper 3' section of drive casing can be unscrewed and removed from sampler 150.

During the removal of the upper section of drive casing 154, lower clamp 212 remains clamped to drive casing 154 to prevent sampler 150 from falling into the borehole. After the upper section of drive casing is removed, upper clamp 208 is then reclamped to a lower portion of drive casing 154 and the procedure can then be repeated.

Rig-mounted drive and retraction controls 320 include pressure cylinder control 122, which controls the pressure applied through housing 312 and through hammer housing 302 via hammer slide 306 and hammer support stanchion 308. A hammer pounding control 322 controls the rate of hammer blows applied through hammer foot 304. A hammer slide control 324 activates hammer slide 306 to position hammer foot 304 horizontally over drive head 160.

Upper clamp control 206 controls two hydraulic clamp cylinders inside clamp drive housing 312. Upper clamp control 206 can be operated to close clamp 208 around drive casing 154, or can be operated in reverse to release drive casing 154.

Vibrator control 120 operates hydraulic vibrators 114 in the preferred range of 50–125 Hz. Vibrators 114 are especially useful in eliminating side wall friction so that drive casing 154 (containing sample barrel 158 and sample liners 156) slides easily into the soil.

Lower clamp control 210 controls a hydraulic clamp cylinder (not shown) inside the lower frame of rig 110. Lower clamp control 210 can be operated to close the lower clamp around drive casing 154, or in reverse to release drive casing 154. As discussed above, the lower clamp does not vibrate.

Winch control 202 operates winch 204; winch 204 provides 300 pounds of line pull. Controls 320 are mounted together on rig 110 to provide ease of use.

Double-rod sampling system 100 can drive slant borings up to 90° from the vertical (i.e., horizontally), providing the capability of sampling under buildings and in areas difficult to access by vertical drilling. In using this feature, rig 110 is angled as desired on its mounting. For angles less than 90°, the system is typically mounted on a conventional skid loader. Mounting the rig on a skid loader makes it easily transportable to testing sites, and easily maneuverable once on the site.

Figure 4:
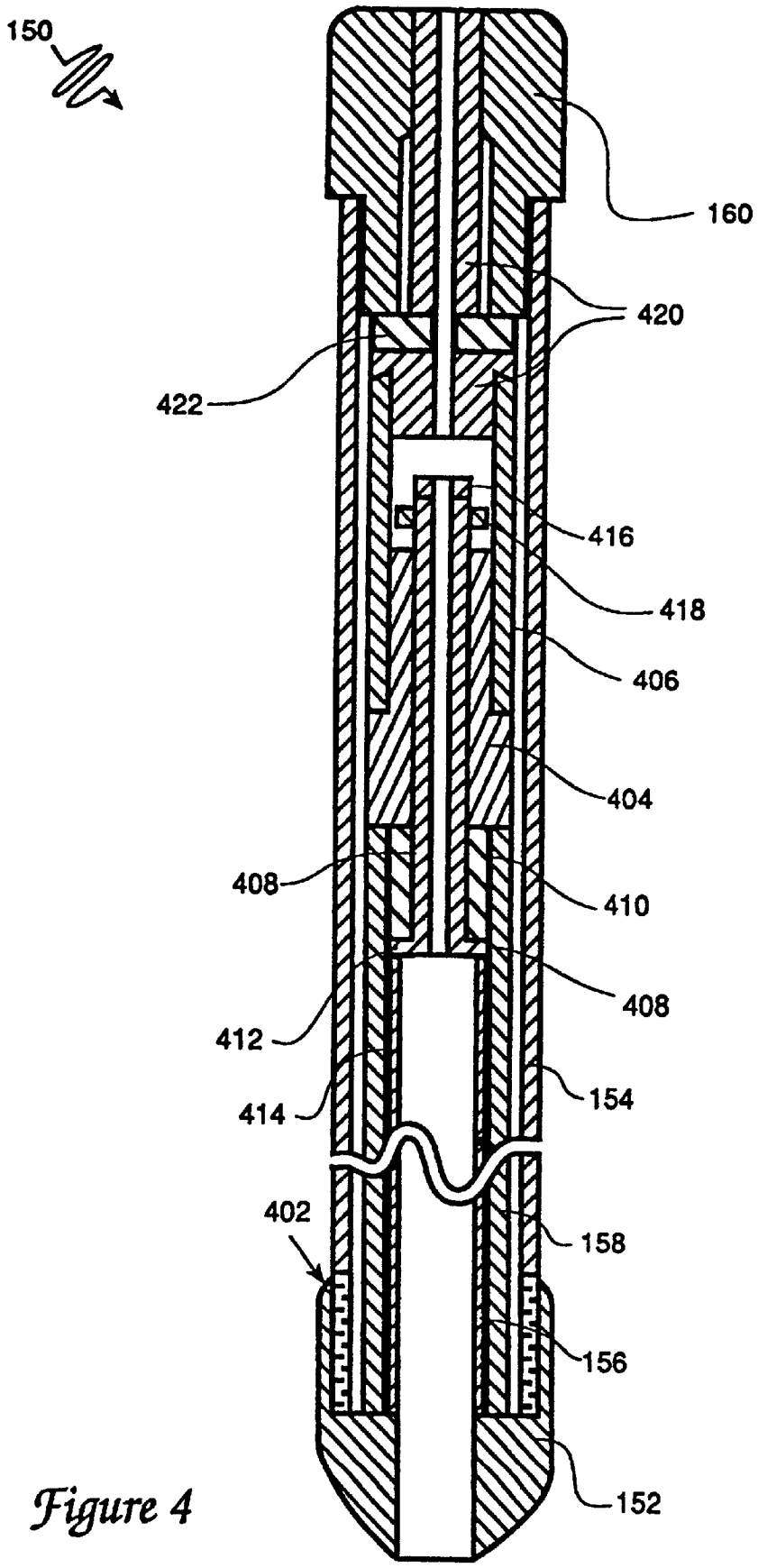
FIG. 4 is a schematic sectional view of a portion of the double-rod sampler of FIGS. 1 and 2.

The double-rod sampler comprises cylindrical metal tubes, shown schematically (not to scale) in FIG. 4. The outermost cylinder comprises three-foot segments of drive casing 154. Each segment is a 2.125" outer diameter and 1.687" inner diameter hollow tube of heat-treated steel. One end of each drive casing segment is male-threaded at 2.5 threads per inch with a thread depth of 0.01 inches. The opposite end is female-threaded, so that drive casing tube segments 154 can be screwed together.

At the bottommost segment, the drive casing ends in a drive shoe 152. Drive shoe 152 is female-threaded to fit onto the male-threading of drive casing 154. Drive shoe 152 is a hollow steel tube, about 4.125 inches in length with an outer diameter, at its widest, of 2.25". The steel in drive shoe 152 is heat-treated, so that it can withstand forces of hammering and pushing. The final 0.75" of drive shoe 152 tapers to provide a wedge shape for easier soil entry. Drive casing 154 and drive shoe 152 together make up a drive-casing assembly 402 that forms the outermost sheath of double-rod sampler 150. Drive shoe 152 facilitates soil entry of drive casing 154 and sample barrel 158, and extends about 1.8" below the bottoms of sample barrel 158 and sample liner 156.

Sample barrel 158 is disposed inside drive casing 154. Sample barrel 158 is a three-foot long tube of carbon steel with a 1.625" outer diameter and 1.527" inner diameter. An expansion coupler 404 is male-threaded to attach to sample head coupling 406. Expansion coupler 404 has a hole through it through which an expansion bolt 408 threads. As expansion bolt 408 tightens against coupler 404, a rubber expansion bushing 410 compresses vertically.

As expansion bushing 410 is compressed by a head 412 at the lower end of expansion bolt 408, the bushing spreads horizontally to engage inner surface 414 of sample barrel 158, thereby rigidly coupling expansion bolt 408 to sample barrel 158. At the opposite end of expansion bolt 408, a hexagonal head 416 provides a grip site for ease in removal of bolt 408. Expansion nut 418 tightens to further secure expansion bolt 408.

Sample head coupling 406 is a hollow cylinder of carbon steel. The top of sample head coupling 406 is female-threaded so as to attach the male-threaded end of a compression bolt 420 (in the first round of sampling) or, alternatively, to attach the male-threaded end of an inner rod 162 (not shown in FIG. 4) in subsequent rounds of sampling. Inner rod 162 is a hollow tube of carbon steel, male-threaded at the lower end and female-threaded at the upper end so that lengths of inner rod can be attached to each other. Inner rod 162 is sized to thread onto compression bolt 420 and to fit within sampler 150.

The lower end of compression bolt 420 screws onto sample head coupling 406. The upper end of compression bolt 420 extends through drive head 160. Compression bolt 420 and associated compression bushing 422 push sample barrel 158 against drive shoe 152 (via lower sample head coupling 406, expansion coupler 404, expansion bushing 410, and expansion bolt 408).

After the initial 3-foot advance of sampler 150, three-foot segments of inner rod 162 are rigidly coupled to sample barrel 158 via lower sample head coupling 406, expansion coupler 404, and expansion bolt 408.

Six 6-inch by 1½ inch-diameter stainless steel sample liners 156 fit inside sample barrel 158. When drive casing 154 and sample barrel 158 are advanced, soil is driven into sample liners 156. Sample liners 156 can then be removed for analysis by chemical or geologic laboratories. Sample liners 156 are dimensioned to be compatible with existing standardized laboratory requirements.

Figure 5:
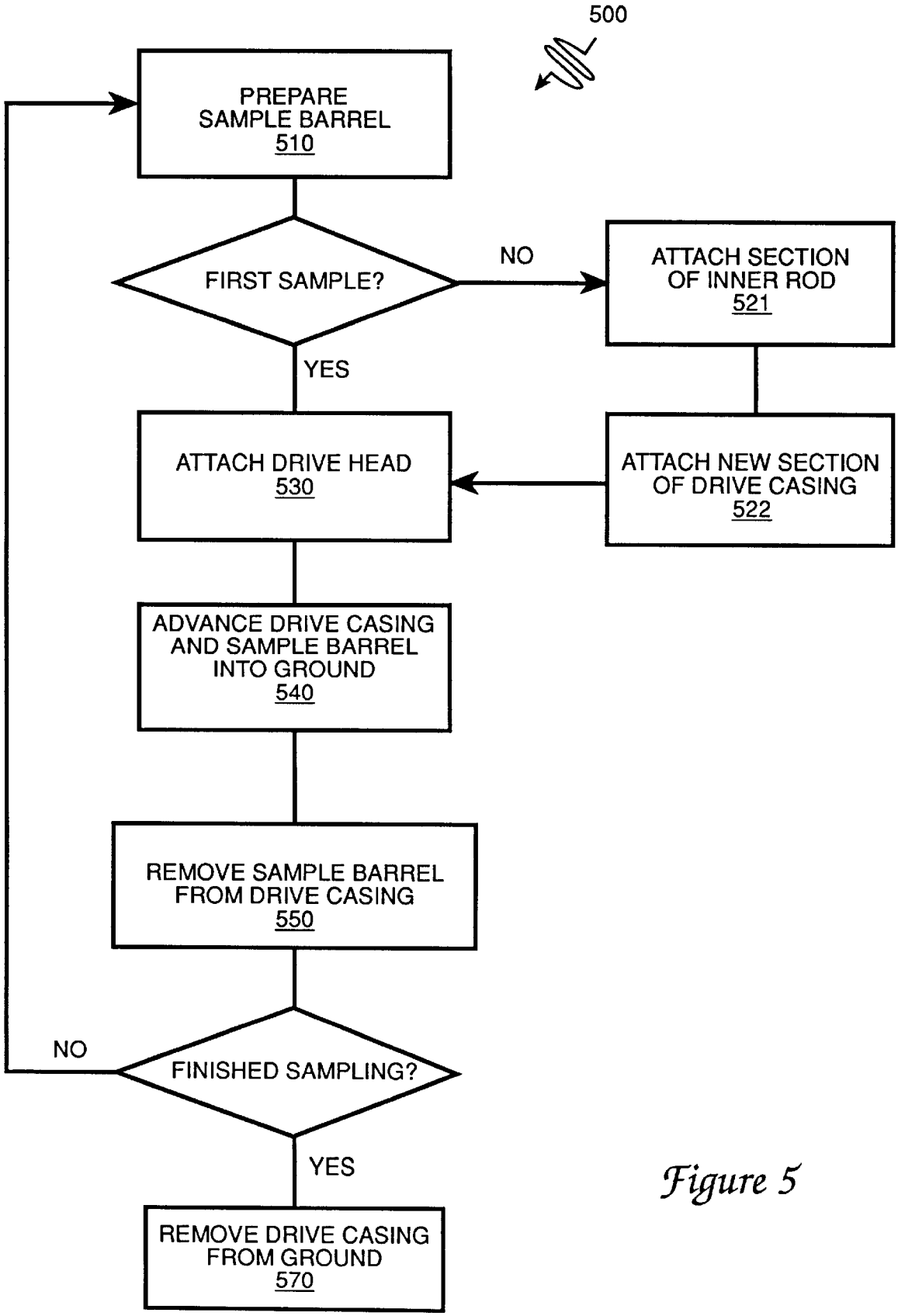
FIG. 5 is a flow chart of a method of using the double rod system of FIGS. 1 and 2.
Figure 6:
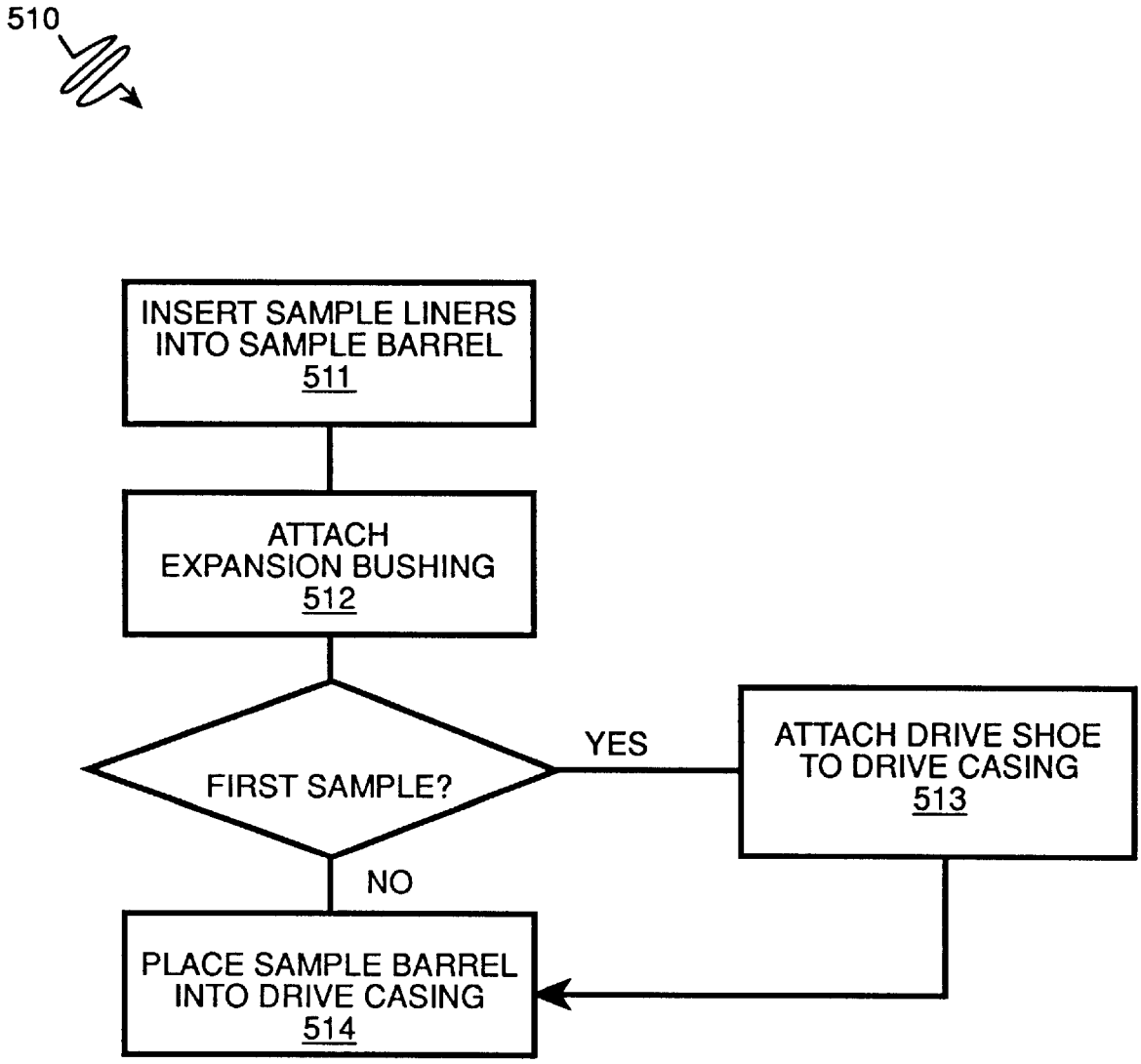
FIG. 6 is a flow chart of substeps of step 510 of the method of FIG. 5.

A method 500 of the invention is shown in overview in FIG. 5. The steps of method 500 are broken down into more detailed substeps in FIGS. 6, 7, and 8. The first round of a multi-round sampling proceeds as follows. At step 510, a fresh sample barrel is prepared, as shown in FIG. 5. The following substeps 511–514 of step 510, shown in FIG. 6, are undertaken to prepare the barrel: Sample liners 156 are inserted, at substep 511, into sample barrel 158. An expansion bushing 410 and other inner components, including expansion bolt 408, are attached, at substep 512, to the sample barrel. A drive shoe 152 is screwed onto drive casing 154 at substep 513. The sample barrel (with rigidly attached expansion bushing 410 and expansion bolt 408) is placed, at substep 514, into drive casing 154. Drive head 160 is then attached, at step 530, to rigidly couple the sample container and drive casing 154, as shown in FIG. 5. The coupled drive casing and sample container are then driven, at step 540, into the soil to a sample bottom depth.

Figure 7:
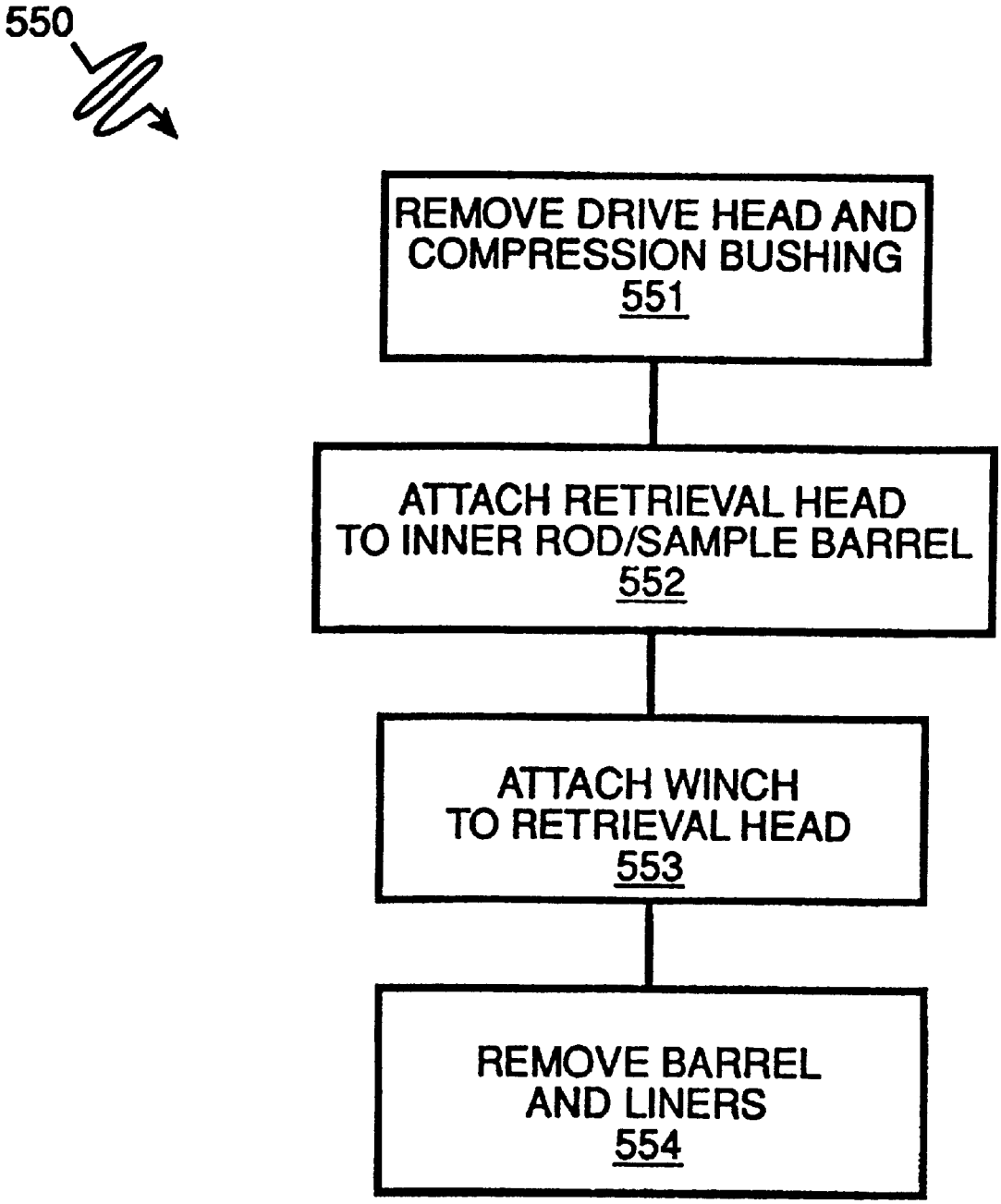
FIG. 7 is a flow chart of substeps of step 550 of the method of FIG. 5.

As the sampler is driven into the soil, sample liner 156 becomes filled with soil. When sample liner 156 is filled with a soil sample, it is removed, at step 550, from the drive casing. Substeps 551–554 of step 550 are shown in FIG. 7. To effect removal, drive head 160 and compression bushing 410 are removed, at substep 551, from sample barrel 158. A retrieval head, threaded at one end and with a ball at the other, is screwed onto sample barrel 158 at substep 552. Line from winch 204 is then fed through the bail to attach the winch to the retrieval head, at substep 553. Winch 204 is then activated to remove sample barrel 158 and sample liners 156, at substep 554. The first round of sampling is complete.

To proceed with another round of sampling, sample barrel 158 is prepared again, at step 510, as shown in FIG. 5. A section of inner rod is then attached, at step 521, to sample barrel 158, as shown in FIG. 5. A new 3' section of drive casing is threaded onto drive casing 154, at step 522. Drive head 160 is then attached, at step 530, and the method proceeds as described above. Subsequent rounds of sampling vary in minor ways. The retrieval head is attached, at substep 552, to inner rod 162 instead of to sample barrel 154. A new section of inner rod is attached to the inner rod, at step 521, instead of to sample barrel 158. Otherwise, the method proceeds as described above.

Figure 8:
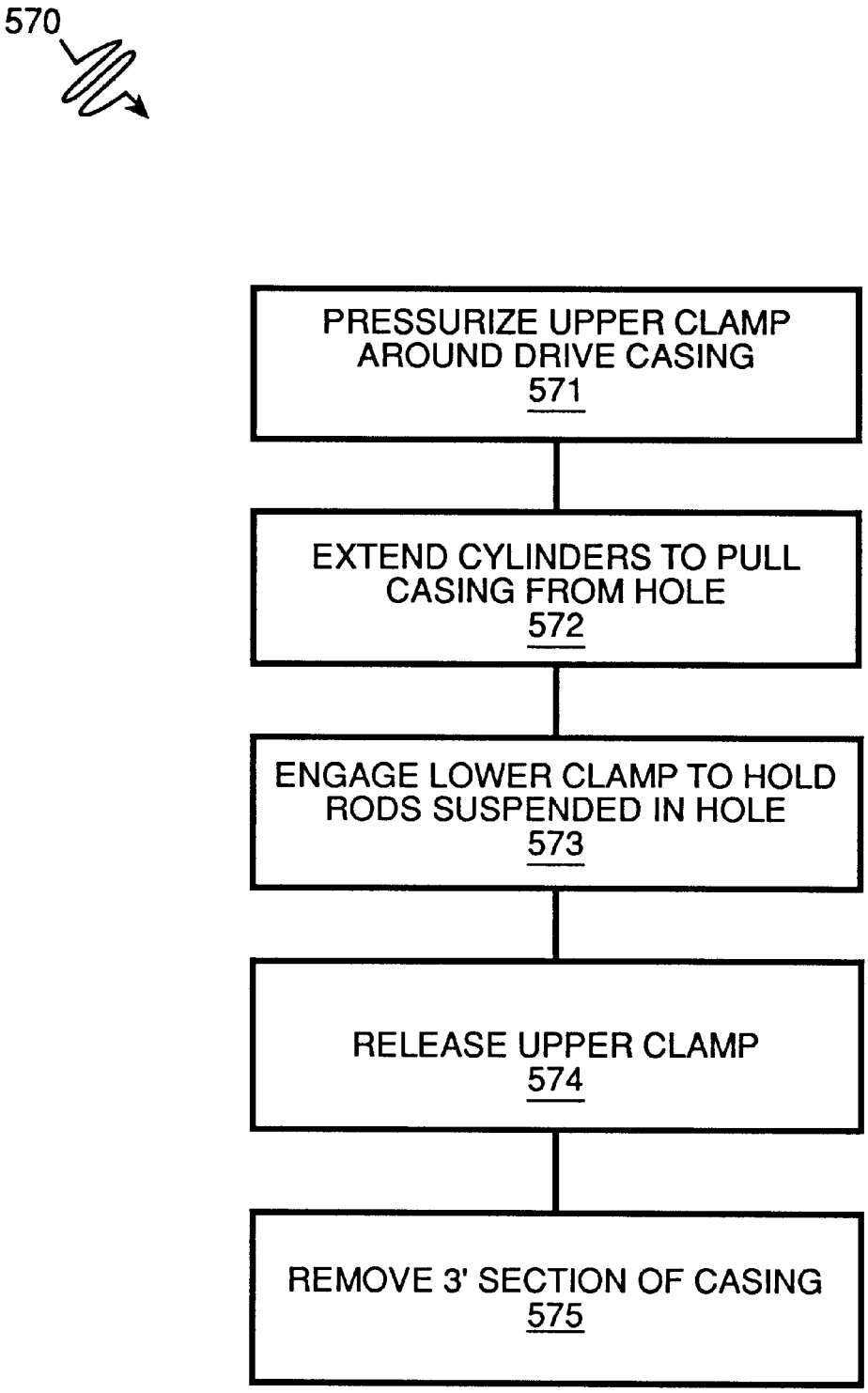
FIG. 8 is a flow chart of substeps of step 570 of the method of FIG. 5.

When sampling is finished, the remaining sampler components are removed, at step 570, from the ground. Substeps 571–575 of step 570 are shown in FIG. 8. To effect removal, upper clamp 208 is pressurized, at substep 571, to close around drive casing 154. Pressure cylinders 116 are then extended, at substep 572, to pull drive casing 154 several feet from the borehole. Lower clamp 212 is then engaged, at substep 573, to hold drive casing 154 and other sampler components to prevent them from falling into the borehole. Upper clamp 208 is then released, at substep 574. The uppermost 3' section of drive casing 154 is then unscrewed and removed, at substep 575. If further sections of casing are to be removed, substeps 571–575 can be repeated.

Use of the apparatus and method of the invention creates minimal cuttings. Soil is displaced only about ¼" on a side, and is generally compressed into the surrounding soil.

Materials other than steel can be used to manufacture the soil sampler. The rig of the invention can be configured in many different ways, so long as the claimed functions are enabled. Alternative embodiments employ other dimensions of rig 110 and sampler 150. The rig may be mounted on other than skid loaders (for example, on a small truck, forklift, or four-wheel drive vehicle), or may be free standing.

The system is compatible with standard sample liners as preferred by testing laboratories, but can be used with other sample liners. Alternatively, the invention does not require a separate sample barrel and liners; one cylinder can suffice for both functions. Except where particularly specified, the term "drive" applied to advancing the double-rod solid sampler comprises all methods of advancing the sampler, including pounding, hammering, continuous pressure, intermittent pressure, and vibration.

Normally, it is contemplated that the sampler will be driven straight down or at a small angle from the vertical. However, the invention provides for drilling at greater angles from the vertical, horizontally, and even in an upward direction. Each sample has a minimum depth from surface and a maximum depth from the surface. When the sampler is driven straight down, the maximum depth is at the bottom of the sample. When the sampler to driven horizontally, the maximum sample depth is the furthest distance of the sample from the surface through which the sample was accessed.

The double-rod system is compatible with other uses of accessing subsurface volumes. The system can be used to measure or collect groundwater samples. For example, a piezometer can be disposed within the drive casing after the sample barrel has been removed and prior to removing the drive casing. The piezometer can then be used to measure water levels. Similarly, a soil vapor extraction well can be disposed within the drive casing after the sample barrel has been removed. The soil vapor extraction well can then be used to extract vapor samples.

The double-rod system can be used in soil venting. Soil venting is typically used to increase the activity of bacteria already in the soil. The bacteria consume hydrocarbons, and soil venting is used to accelerate the process of cleaning the soil. To vent soil, a length of perforated small-diameter polyvinyl chloride (PVC) pipe, sized to fit the inner diameter of drive casing 154, can be disposed within the drive casing instead of a sample barrel and liners after the sample barrel has been removed and prior to removing the drive casing. Bacterial nutrients such as oxygen and nitrogen can then be pumped into the soil. In some cases, the temperature can be elevated to improve bacterial activity. The pipe need not be PVC and need not be perforated. These and other modifications to and variations upon the described embodiments are provided for by the present invention, the scope of which is limited only by the following claims.

What is claimed is:

1. A method for extracting a subsurface sample comprising the steps of:

rigidly coupling a sample container to a drive casing;

driving said drive casing until said sample container attains a maximum sample depth; and removing said sample container from said drive casing.

2. A method as recited in claim 1 wherein at the end of said driving step, the depth of said sample container and the depth of said drive casing are at most 12" apart.

3. A method as described in claim 1 wherein while said sample container is removed from said drive casing, said drive casing remains at the depth it attains when said sample container attains said sample depth.

4. A method as described in claim 1 wherein said sample container is in direct contact with said sample.

5. A method for extracting a soil sample comprising the steps of:

rigidly coupling a sample container to a drive casing assembly;

driving said drive casing assembly below a sample bottom depth so that said sample container attains said sample bottom depth; and removing said sample container from said drive casing.

6. A method for collecting a continuous soil sample comprising the steps of:

rigidly coupling a sample container to a drive casing;

driving said drive casing down until said sample container attains a first sample bottom depth;

removing said sample container from said drive casing;

rigidly coupling a second sample container to said drive casing while said drive casing remains at the depth it attained when said sample container attained said first sample bottom depth; and driving said drive casing downward until said second sample container attains a second sample bottom depth, the distance between said second sample bottom depth and said first sample bottom depth being not more than twice the length of said second sample container.

7. A method for extracting a soil sample comprising the steps of:

inserting sample liners into a sample barrel;

placing said sample barrel into a drive casing;

attaching a drive head to rigidly couple said sample barrel and said drive casing;

driving said sample liners, said sample barrel, and said drive casing simultaneously into soil to be sampled until said sample liners obtain a sample;

attaching a winch to said sample barrel; and retracting said sample barrel and said sample liners from said drive casing.

8. A method as described in claim 7 wherein after said retracting step, sample liners are again placed in said sample barrel, a segment of inner rod is attached to said sample barrel, a second length of drive casing is attached to said drive casing, and said sample liners, said sample barrel, and said drive casing are simultaneously driven into said soil.

9. An apparatus for extracting a soil sample comprising:

drive casing means for casing off a borehole;

sample container means for containing a soil sample obtained from said borehole;

drive head means for rigidly attaching said sample container means and said drive casing means; and drive means for simultaneously driving said sample container means and said drive casing means into soil.

10. An apparatus as described in claim 9 wherein said drive means includes a pressure drive means, a hammer drive means, and a vibratory drive means, said vibratory drive means operating within a preselected frequency range of from 50 to 125 Hertz.

11. An apparatus as described in claim 10 wherein said pressure drive means, said hammer drive means, and said vibratory drive means independently drive said sample container into soil.

*12. A method of collecting a subsurface soil sample, comprising the steps of:*

*assembling a double-rod sampler including*

*i) a drive casing,*

*ii) a sample container within said casing, and*

*iii) a drive head means for drivingly connecting said casing and said sample container means;*

*direct pushing, without rotation, said double-rod sampler through said drive head means by engaging said drive head means with a direct push system to thereby drive said drive casing and said sample container into the soil as a unit and to fill said sample container means with a soil sample during advancement of said double-rod sampler,*

*terminating said direct pushing of said double-rod sampler to thereby locate said double-rod sampler at a predetermined position in the soil, and*

*withdrawing said sample container means upwardly through said drive casing while said drive casing remains stationary at said position.*

*13. A method as defined in claim 12, wherein said soil sample container includes a sample barrel, and*

*said method further comprises the step of removing said soil sample from said sample barrel after the withdrawal of said sample container means.*

*14. A method as defined in claim 13, wherein said sample barrel receives a sample liner for receiving and containing said soil sample during said advancement of said double-rod sampler, and wherein*

*said removing of said soil sample includes removing said liner from said sample barrel with the contained soil sample therein.*

*15. A method as defined in claim 13, and further comprising the steps of:*

*adding a segment of drive casing to an upper end of drive casing of said double-rod sampler after withdrawal of said sample container means,*

*reinserting said sample barrel while adding a section of an inner rod between said sample barrel and said drive head means,*

*direct pushing, without rotation, said double-rod sampler to advance said double-rod sampler as a unit from said predetermined position to a second predetermined position to fill said sample container means with a consecutive soil sample,*

*again withdrawing said sample container means upwardly through said drive casing while said drive casing remains stationary at said second position, and*

*removing said consecutive soil sample from said sample barrel.*

*16. An apparatus for extracting a soil sample comprising:*

*a double-rod sampler, said double rod sampler further comprising:*

*drive casing means for casing off a borehole;*

*sample container means for containing a soil sample obtained from said borehole;*

*drive head means for rigidly attaching said sample container means and said drive casing means, said rigid attachment enabling said sample container and said drive casing to be simultaneously driven into soil,*

*said drive head means having a drive means engaging portion whereby said sample container means and said drive casing means are simultaneously driven by said drive head on driving engagement of said drive head by a drive means.*

*17. An apparatus as defined in claim 16, wherein said apparatus further comprises a drive means selected from the group consisting of: pressure drive means, a hammer drive means, and vibrating drive means.*

*18. An apparatus as defined in claim 17, wherein said drive means includes independently operable pressure drive means, a hammer drive means, and vibrating drive means.*

*19. An apparatus for extracting a soil sample comprising:*

*a double-rod sampler including:*

*drive casing means for casing off a borehole,*

*sample container means within said casing means and having an open lower end for receiving a soil sample, and*

*drive head means for engagement by a non-rotating direct push system and for drivingly connecting said casing means and said sample container means during direct push by said direct push system,*

*whereby said casing means and said sample container means are so constructed and arranged to be driven simultaneously into the soil through said drive head means on driving engagement of said drive head means by said direct path system.*

*20. An apparatus as defined in claim 19, wherein:*

*said drive casing terminates at a lower end in a drive shoe,*

*said drive shoe comprising a hollow steel tube having a tapered outer surface at a forward edge for easier soil entry.*

*21. An apparatus as defined in claim 20, wherein:*

*said sample container means includes:*

*a sample barrel having a lower open end adjacent said drive shoe for receiving a soil sample through said shoe as said casing means and said sample container means are simultaneously driven into said soil.*

*22. An apparatus as defined in claim 16, wherein*

*said casing means terminates at the lower end thereof in a drive shoe, and*

*said sample container means includes a sample barrel having a lower end thereof adjacent said drive shoe.*

*23. An apparatus as defined in claim 22, wherein*

*said casing means includes a plurality of connectable segments, and*

*said sample container means further includes, a plurality of connectable inner rods extending between said drive head means and said sample barrel.*

*24. An apparatus as defined in claim 23, further comprising:*

*a compression bushing disposed between an uppermost one of said inner rods and said drive head means.*

*25. An apparatus as defined in claim 22, further comprising:*

*a removable sample liner received in said sample barrel.*

*26. A method of collecting a subsurface soil sample, comprising the steps of:*

*assembling a double-rod sampler including*

*(i) a drive casing;*

*(ii) a sample container within said casing, and*

*(iii) a drive head means for drivingly connecting said casing and said sample container means;*

*driving said double-rod sampler through said drive head means by engaging said drive head means with a drive system to thereby drive said drive casing and said sample container as a unit such that the relative positions of the drive casing and sample container remain the same throughout said driving steps and to fill said sample container means with a soil sample during advancement of said double-rod sampler in the soil;*

*terminating said driving of said double-rod sampler to thereby locate said double-rod sampler at a predetermined position in the soil; and*

*withdrawing said sample container means upwardly through said drive casing while said drive casing remains stationary at said position.*

* * * * *